(12) United States Patent
Lepschi et al.

(10) Patent No.: US 12,117,723 B2
(45) Date of Patent: Oct. 15, 2024

(54) SHUTTER INSTALLATION FOR AN OPTICAL BEAM PATH

(71) Applicant: CARL ZEISS MICROSCOPY GMBH, Jena (DE)

(72) Inventors: Jana Lepschi, Jena (DE); Nils Egewardt, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 517 days.

(21) Appl. No.: 17/455,627

(22) Filed: Nov. 18, 2021

(65) Prior Publication Data

US 2022/0155654 A1 May 19, 2022

(30) Foreign Application Priority Data

Nov. 18, 2020 (DE) ...................... 10 2020 214 555.5

(51) Int. Cl.
*G03B 9/52* (2021.01)
*G02B 26/02* (2006.01)

(52) U.S. Cl.
CPC ............... *G03B 9/52* (2013.01); *G02B 26/02* (2013.01)

(58) Field of Classification Search
CPC ... G03B 9/52; G03B 9/10; G03B 9/60; G02B 26/02; G02B 21/06; G02B 27/646; G02B 26/04; G02B 21/00
See application file for complete search history.

(56) References Cited

U.S. PATENT DOCUMENTS

| | | | | |
|---|---|---|---|---|
| 4,561,743 A | * | 12/1985 | Benson | ................... G03B 1/00 396/401 |
| 7,123,251 B2 | | 10/2006 | Ishii et al. | |
| 9,442,281 B2 | | 9/2016 | Hayashi et al. | |
| 2002/0094204 A1 | | 7/2002 | Mizukami et al. | |
| 2007/0159677 A1 | | 7/2007 | Doering et al. | |

FOREIGN PATENT DOCUMENTS

| | | |
|---|---|---|
| CN | 104380170 A | 2/2015 |
| DE | 102007024756 A1 | 11/2008 |
| EP | 1719009 B1 | 12/2009 |
| JP | 2003330033 A | 11/2003 |

* cited by examiner

*Primary Examiner* — James C. Jones
(74) *Attorney, Agent, or Firm* — Brake Hughes Bellermann LLP

(57) ABSTRACT

A shutter installation for an optical beam path includes: a shutter element for shutting the optical beam path; a drive for moving the shutter element in a controlled manner along a displacement path between two terminal positions; and at least one detent block having in each case a detent face against which the shutter element in one of the terminal positions is in each case moved, or able to be moved, respectively. Each detent block is configured so as to be displaceable such that the respective detent block, by the shutter element, is able to be displaced from the terminal position of the detent block by a distance along a displacement path.

10 Claims, 5 Drawing Sheets

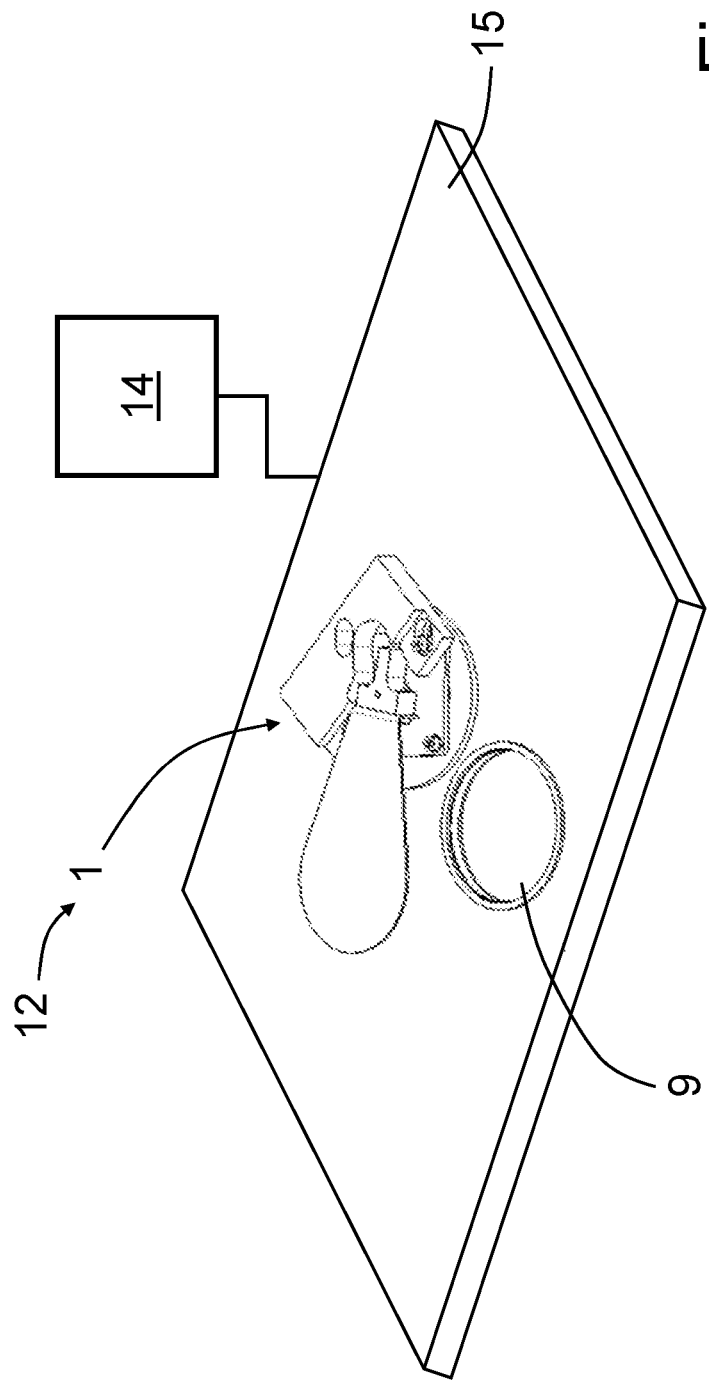

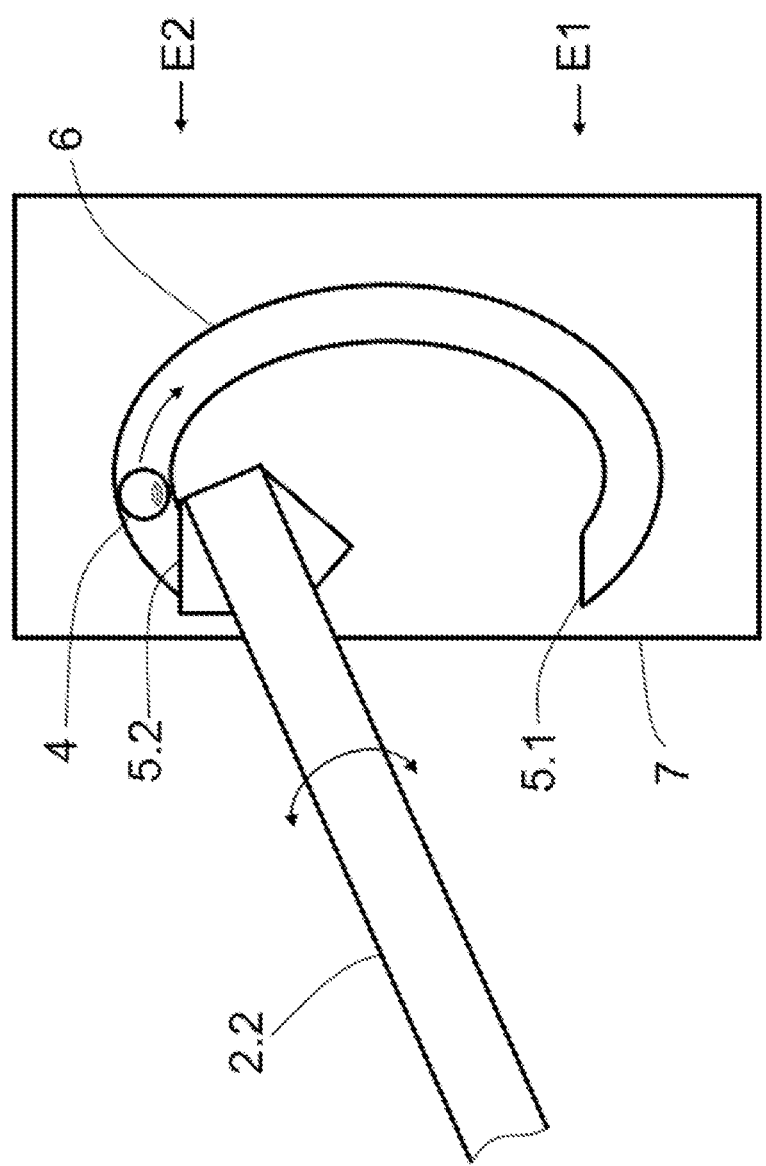

SHUTTER INSTALLATION FOR AN OPTICAL BEAM PATH

CROSS REFERENCE TO RELATED APPLICATION

This application claims priority to German Application No. 10 2020 214 555.5, filed Nov. 18, 2020, the disclosure of which is incorporated herein by reference in its entirety.

TECHNICAL FIELD

The invention relates to a shutter installation for an optical beam path.

SUMMARY

In optical apparatuses, in particular microscopes, there is often the requirement for an existing optical beam path to be repeatedly completely or partially opened or closed, respectively. Several possibilities for potentially implementing such a shutter movement are known from the prior art. It is in particular known that at least one shutter element can be slid, pivoted, or swiveled into the beam path by means of a respective drive. Further shutters are radially operating apertures, for example.

A method for controlling a light shutter is thus disclosed in EP 1 719 009 B1, for example. Here, a shutter is moved back and forth between two mechanical detents by means of a stepper motor. CN 104380170 A specifies a drive of the shutter element by means of a connecting rod. In order to reduce a transmission of the vibrations of the shutter element when opening or shutting, respectively, to the housing of the microscope, it is proposed in JP 200333033 A that the shutter element is mounted on an elastic element. A shutter in which a drive is relocated between two detents is presented in US 2002/0094204 A1.

In all these possibilities such as sliding, pivoting or swiveling, the range of movement, or the path which the shutter element is to travel (shutter path), respectively, has to be delimited. This can take place by mechanical detents, for example, or by delimiting the number of steps of a stepper motor.

When a stepper motor is used, the movement of a shutter plate serving as a shutter element can be accelerated and decelerated only in a relatively slow manner because the stepper motor would otherwise not move correctly to the desired position.

If the delimitation takes place by a mechanical detent, a DC motor (direct current motor) can also be used instead of a stepper motor. It is advantageous here that a DC motor of identical size can be accelerated in a significantly more rapid manner. However, this DC motor has to be decelerated after a specific time and/or moved against the mechanical detent. As opposed to the stepper motor, the abrupt deceleration of the shutter element when impacting the mechanical detent here creates problems. The shutter element, hereunder also referred to as the shutter, upon impacting rebounds to over a certain distance, or continues to vibrate for a relatively long time, which is problematic in terms of the correct execution of repeated rapid shutter movements. A respective counter movement can be carried out only once the shutter has come to a complete standstill.

The rebound movement can indeed be reduced by way of a softer material of the detent, but an exact positioning of the shutter element is no longer possible in this instance. Moreover, there is a negative effect on the achievable cycle time by virtue of the waiting time required until the elastic material relaxes. Relaxation here describes the return of the deformed elastic material to the initial position or initial shape thereof, respectively.

Another potential solution for reducing the cycle time lies in using a rotary disk which is fastened to a motor axle, for example. The diameter of the rotary disk is chosen to be so large that the latter obscures the optical beam path. The rotary disk has open segments or cut-outs such that the beam path can be exposed or obscured in each case as a function of the position of the rotary disk. The rotary disk can be rotated at a speed which is adapted to the required cycle time. This technical solution does indeed avoid the problem of the rebounding on a detent but does require a large installation space in the microscope. Moreover, the frequency of the open/shut movements, as well as the duration of the respective positions "shutter open" and "shutter closed", respectively, is predefined within tight limits by the respective mechanical construction in this solution.

The invention is based on the object of proposing a possibility for repeatedly opening and shutting an optical beam path, in which possibility the disadvantages of the prior art, in particular rebounding and post-impact vibrating of the shutter element, are minimized.

The object is achieved by a shutter installation according to the main claim. Advantageous refinements are the subject matter of the dependent claims.

The shutter installation for an optical beam path includes a shutter element for shutting the optical beam path as well as a drive for moving the shutter element in a controlled manner along a displacement path between two terminal positions. Furthermore, there is at least one detent having in each case one detent face against which the shutter element in one of the terminal positions is in each case moved, or able to be moved, respectively.

As described herein, the shutter installation is includes one or more detents, each configured as a displaceable detent block, which is able to be displaced, by the moving shutter element, from the terminal position of the detent block by a distance along a displacement path.

As described herein, the disadvantages which arise in rigid, thus non-displaceable, detents can be reduced or entirely avoided by applying the principles of an elastic or non-elastic shock in a smart manner.

As described herein, a displaceable detent block is not to be considered to be synonymous with a sprung detent or a purely elastic detent. As a consequence of the impact of the shutter element, the detent block is moved as an entity along the displacement path, irrespective of any elastic deformation of the detent block or of the component parts of the latter that may take place simultaneously. The detent block here acquires the dynamic energy and the impulse of the shutter, such that the latter comes to a standstill without rebounding.

In some embodiments, each of the detents can be configured as a separate detent block. Optionally, one detent block can be mechanically connected to the other detent block, for example by means of an articulation or a gear mechanism. In some embodiments, the detent block is configured as a ball or roller, which, as a consequence of an impact of the shutter element, is moved along a predefined path which functions as the displacement path, thus reaching the terminal position of the other detent. The ball or roller at the terminal position of the other detent assumes the function of the other detent block. The ball or roller is moved back and forth between the terminal positions as a result of the impact of the shutter. Alternatively, the detents are component parts or regions of a common detent block.

It is advantageous when a respective terminal position of a detent block is re-established, or able to be re-established, respectively, as a consequence of the displacement of the respective other detent block. In this way, additional components for re-establishing the respective terminal position can be largely dispensed with, and a simple and cost-effective construction requiring infrequent maintenance can be achieved. Re-establishing the terminal position of the respective other detent block can be achieved, for example, by way of a design of a common detent block in a U-shape, or by way of a U-shaped recess. The detent faces in this instance are situated on the legs of the U-shape. Moreover, it is possible for the detent blocks to be mutually connected and be mechanically positively coupled, for example, as is, in principle, already the case with a common detent block.

The detent faces of the at least one detent block, in particular the surfaces of the detent faces, can be composed of a hard material. Such an embodiment increases the wear resistance of the detent face and reduces undesirable abrasion. A hard material here is understood to be a material of which the Vickers hardness HV is in the range from 200 to 600. Such hard detent faces can be generated, for example, by anodizing or hard anodizing suitable materials, for example, aluminum. For example, the detent block can be composed of aluminum, the detent faces thereof being hard anodized and having a hardness of approximately HV 400. The detent block can be composed of arbitrary materials or composite materials. Metals, alloys, plastics materials and elastomers may be used as a material, for example.

In further potential embodiments, the detent block in the region of the detent faces can be provided with a coating that offers corresponding protection against wear.

As a consequence of the impact of the shutter element, the latter, apart from the displacement that takes place, can also be elastically deformed and/or dynamic energy can be converted to acoustic noise and/or heat. Acoustic noise arises, in particular, when pairing non-elastic materials of the detent faces and of the shutter element and is often perceived as irritating.

In order for the impact of the shutter on the respective detent face to be damped, the shutter in further embodiments can be decelerated just prior to the mechanical impact. In an embodiment, this can take place in that the poles of a DC motor (direct current motor) that is used for generating the shutter movement of the shutter are briefly reversed while the DC motor is in motion. The magnetic retarding potential created here in the DC motor decelerates the shutter such that the latter travels toward the respective detent at a substantially reduced velocity. The transmitted energy and the shock impulse are thus additionally reduced, this moreover again minimizing the rebound and indeed the acoustic noise of the impact. The motor current and the times for the acceleration and deceleration phases are adjustable.

The drive of the shutter installation can thus be decelerated while traveling a portion of the shutter path. As a result of the displaceable mechanical detent block and of the deceleration of the shutter just prior to the impact, it is achieved that the shutter barely vibrates in the terminal positions, and a reverse impulse can be immediately switched in order for travel to take place again in the opposite direction.

For example, a DC motor, a brushless DC motor (BLDC motor), or a stepper motor can serve as a drive.

As an alternative to at least one displaceable detent block in the form of a metal body, for example, there can be at least one displaceable detent block that is composed completely, or at least in the region of the detent faces, of a soft material such as silicone, for example. Materials with a Shore hardness between 30 and 90 Shore (in particular according to DIN ISO 7619-1) are considered to be soft here. If the detent faces of the detent blocks are composed of a soft material, for example silicone, rubber mixtures, the detent faces have Shore hardness values of approximately 50, for example.

For example, the detent block can be made from a plastics material or an elastomer. In this instance, the detent block is indeed lighter but is potentially also subject to more wear. The lower mass can be compensated for by an applied force that presses the detent block onto the support, for example. This can take place by means of one or a plurality of compression springs or tension springs, respectively, for example. Alternatively or additionally, an additional weight can be placed onto the detent block. The magnitude of the friction arising between the detent block and the support can be influenced by a targeted combination of materials and/or the structures of the latter (see also further below).

The hardness and the shape of the elastic detent block as well as the start-up speed of the shutter are chosen and mutually adapted such that the dynamic energy of the shutter during the impact is largely converted to deformation energy of the detent block and a smaller proportion is converted to motion. The acoustic noise caused here is minor to a negligible extent. The elasticity of the material of the detent faces and/or of the shutter element, and the minor forces during the impact, preclude any plastics deformations. The elastic deformation that arises in the terminal positions upon impact slowly relaxes so as to re-assume the initial state (relaxation). In order for the waiting time until complete relaxation to be shortened, the sustained deformation can be maintained. To this end, the drive, for example a DC motor, can be supplied with a low voltage and kept in position for a duration during which the shutter is to remain in the respective terminal position such that the shutter is pushed against the detent by way of a reduced (holding) force. An elastic material of the detent block should not be chosen to be excessively soft because no defined terminal positions can otherwise be attained.

The displacement of the detent block along the displacement path is a substantial feature of the invention. The length of the displacement path can be influenced by the selection and combination of the materials of the detent block, in particular, on the contact face of the latter in relation to a support on which the detent block rests. The friction that arises between the detent block and the underlying surface here is utilized, in particular, for adjusting the displacement path.

In order for the friction to be adjusted, the magnitude of the contact pressure per unit area between the detent block and the support can be influenced, for example, in that the desired acting forces are adjusted by means of compression springs or tension springs, respectively, and/or the contact pressure of existing adjustment screws. Important parameters for adapting the force ratios and the length of the displacement path are, for example, the pairing of materials, the roughness of the mutually contacting surfaces as well as the respective masses of the components.

Therefore, the shutter installation advantageously has at least one means for adjusting a frictional resistance of the respective detent block along the displacement path. The means for adjusting the frictional resistance are, for example, predetermined roughness values of the mutually contacting surfaces of the detent block and of a support of the detent block, and/or contact pressure means for applying a contact pressure force which is directed from the detent block onto a support of the detent block. The means for adjusting the frictional resistance are advantageously re-adjustable when required.

As a contact pressure means there can be at least one resilient element, for example, an elastic disk or a spring that in the tensioned state presses the detent block against the support, or pulls the detent block away from the latter, respectively, by way of a predetermined acting force. For example, screws by means of which the detent block can be connected to the support, or is connected to the latter, respectively, can in each case be provided with a compression spring or an elastic washer of rubber or any other elastomer. When a screw thus equipped is driven into a corresponding thread, the spring here is simultaneously compressed and exerts a compression force that corresponds to the spring rate of the spring, for example. If an elastic disk is used, the respective compression force is correspondingly derived from the elastic characteristic line of the elastic disk. Advantages derived from the use of springs lie in the self-acting compensation of wear on the mutually contacting surfaces, a certain compensation in the case of temperature variations, and a simple possibility for re-adjusting the screws or the acting forces caused, respectively.

In an analogous manner, the resilient element can also be implemented by a tension spring and by correspondingly directing the tensile force in terms of construction.

Advantages of the invention lie, for example, in a significant reduction or avoidance of the rebounding of the shutter in a shutter installation such that rapid shutter movements are possible. Moreover, the solution dispenses with the use of expensive encoders for a DC motor used. The shutter frequency and the duration of the operating states of an opened shutter, or of a closed shutter, respectively, are able to be adjusted by means of an actuation by software, for example.

BRIEF DESCRIPTION OF THE DRAWINGS

Implementations will be explained in more detail hereunder by means of exemplary embodiments and illustrations. In the figures:

FIG. 6 shows a schematic perspective illustration of the first exemplary embodiment of a shutter installation on a base plate of a microscope; and FIG. 7 shows a schematic illustration of a second exemplary embodiment of a shutter installation having a ball as a displaceable detent block in a plan view.

DETAILED DESCRIPTION

Figure 1:
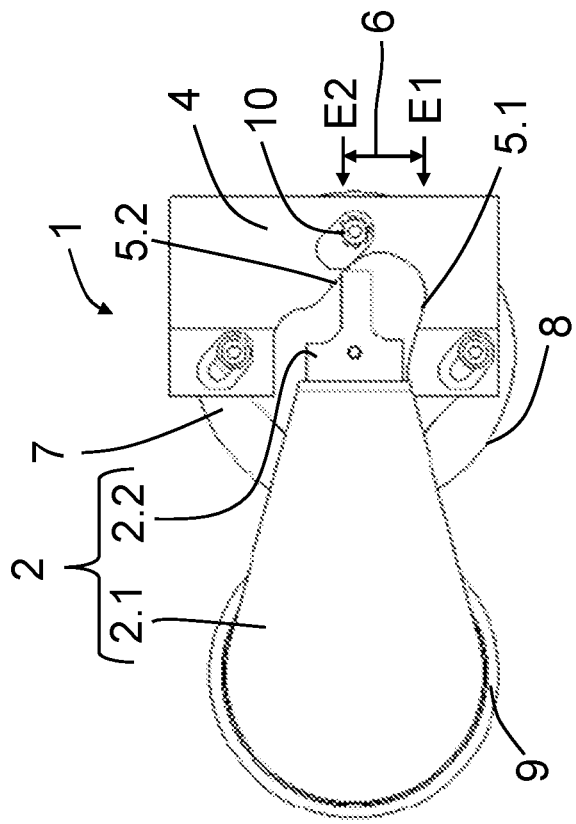
FIG. 1 shows a schematic illustration of a first exemplary embodiment of a shutter installation in a first terminal position.

The substantial elements of a shutter installation 1 include a shutter element 2, a detent block 4 having a first detent face 5.1 and having a second detent face 5.2 and a support 7 (see FIG. 2) on which the detent block 4 is displaceable along a displacement path 6 between a first terminal position E1 and a second terminal position E2 (FIG. 1).

In the first operating position of the shutter element 2 shown in FIG. 1, a shutter leaf 2.1 functioning as a cover of an optical beam path 9 is pivoted out of the optical beam path 9 and situated in the first terminal position E1. A part of the shutter element 2, referred to as the hammer 2.2, in the first terminal position E1 is moved against the first detent face 5.1 of the detent block 4. As a result of the effect of the impact of the hammer 2.2 on the first detent face 5.1, the detent block 4 is displaced along the displacement path 6 (symbolized by a double arrow) such that the second detent face 5.2 is situated at the position of the second terminal position E2. The detent block 4 is connected to the support 7 by means of screws 10. The screws 10 here each sit in an elongate bore in order to enable the movement of the detent block 4. The shutter element 2, by means of a drive 8, in particular, by means of a DC motor, is pivoted in a controlled manner about a rotation axis 3. In the exemplary embodiment, a metal is in each case chosen as the material of the hammer 2.2 and of the detent block 4.

Figure 2:
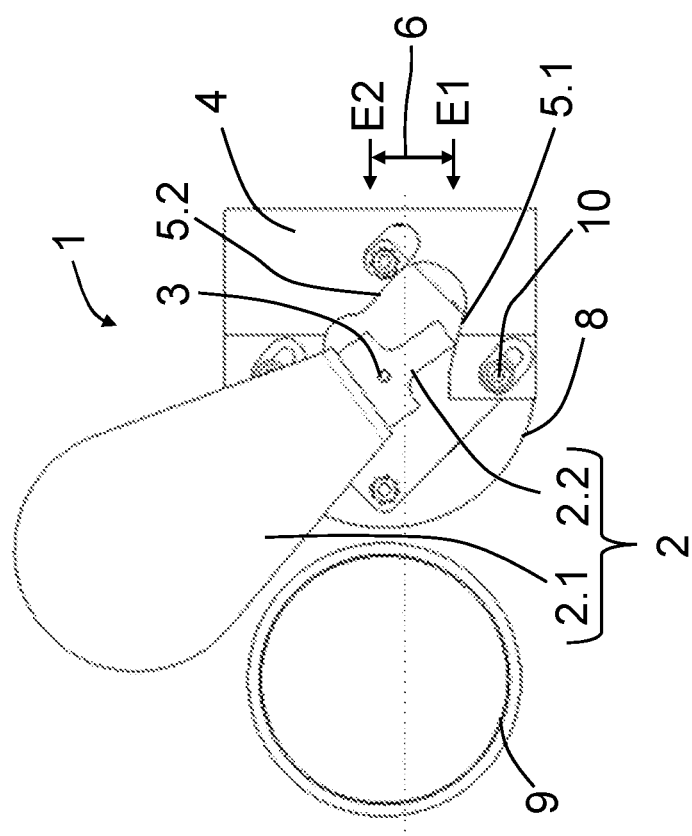
FIG. 2 shows a schematic illustration of the first exemplary embodiment of a shutter installation in a second terminal position.

In a second operating position of the shutter element 2, the hammer 2.2 is moved to the second terminal position E2 and there moved against the second detent face 5.2 (FIG. 2). The optical beam path 9 is shut as a result of the shutter leaf 2.1 which is now pivoted inward. As a consequence of the hammer 2.2 impacting the second detent face 5.2, the detent block 4 is displaced along the displacement path 6 such that the first detent face 5.1 is now situated at the position of the first terminal position E1.

Figure 4:
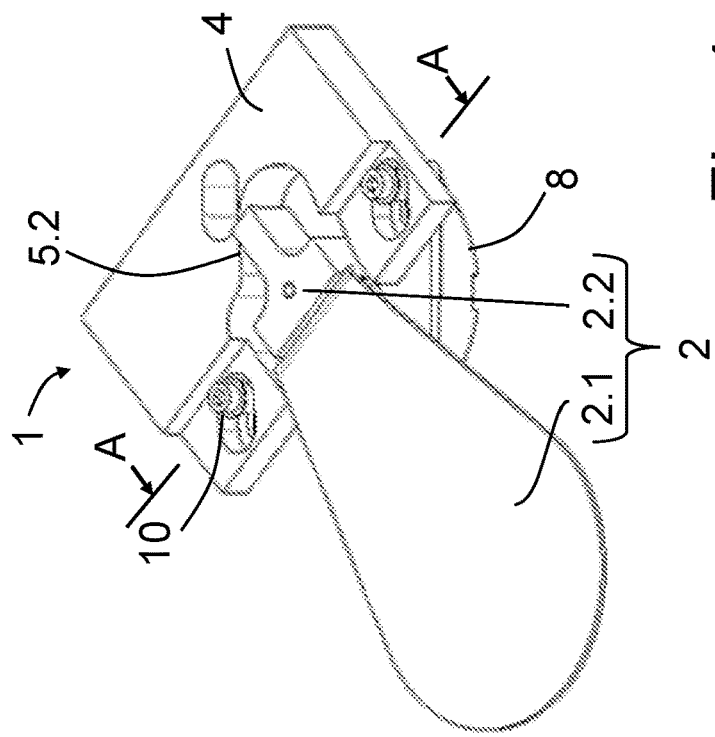
FIG. 4 shows a schematic perspective illustration of the first exemplary embodiment of a shutter installation in a second terminal position.
Figure 3:
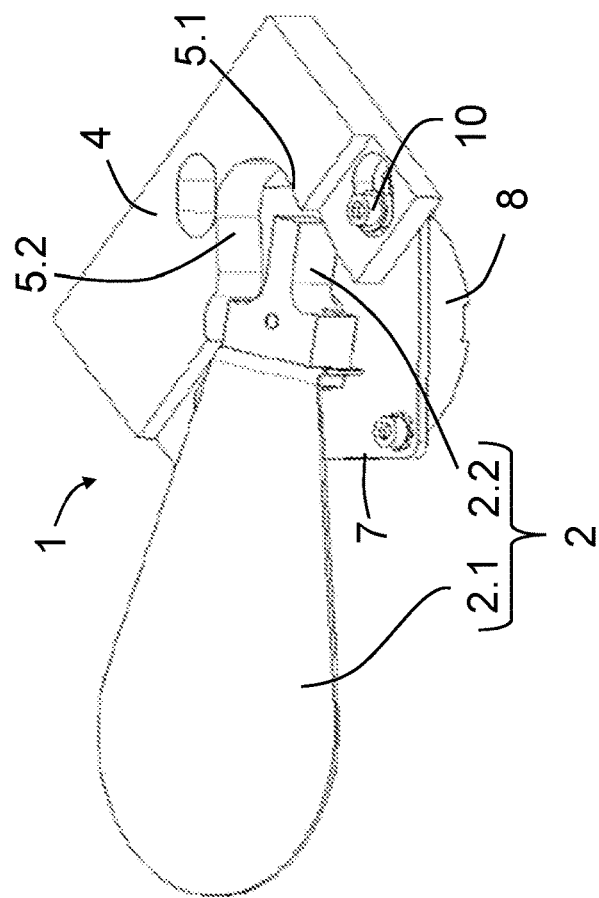
FIG. 3 shows a schematic perspective illustration of the first exemplary embodiment of a shutter installation in a first terminal position.

The first exemplary embodiment of the shutter installation 1 is again shown in a perspective view in the first operating position in FIG. 3 and in the second operating position in FIG. 4, respectively. Lines 13 which serve for supplying the drive 8 with power and for transmitting control commands from a control unit 14 (see FIG. 5) can be seen by virtue of the perspective illustration. A sectional plane A-A is indicated in FIG. 4.

A complex detection of a current situation or position of the shutter leaf 2.1, for example, by means of an additional sensor, is advantageously not required. The position of the shutter leaf 2.1 can advantageously be derived by means of the current polarity of the motor for stopping in the first terminal position E1. Should detection nevertheless be required, this would be possible by using a more expensive motor having an encoder or an additionally installed sensor.

Figure 5:
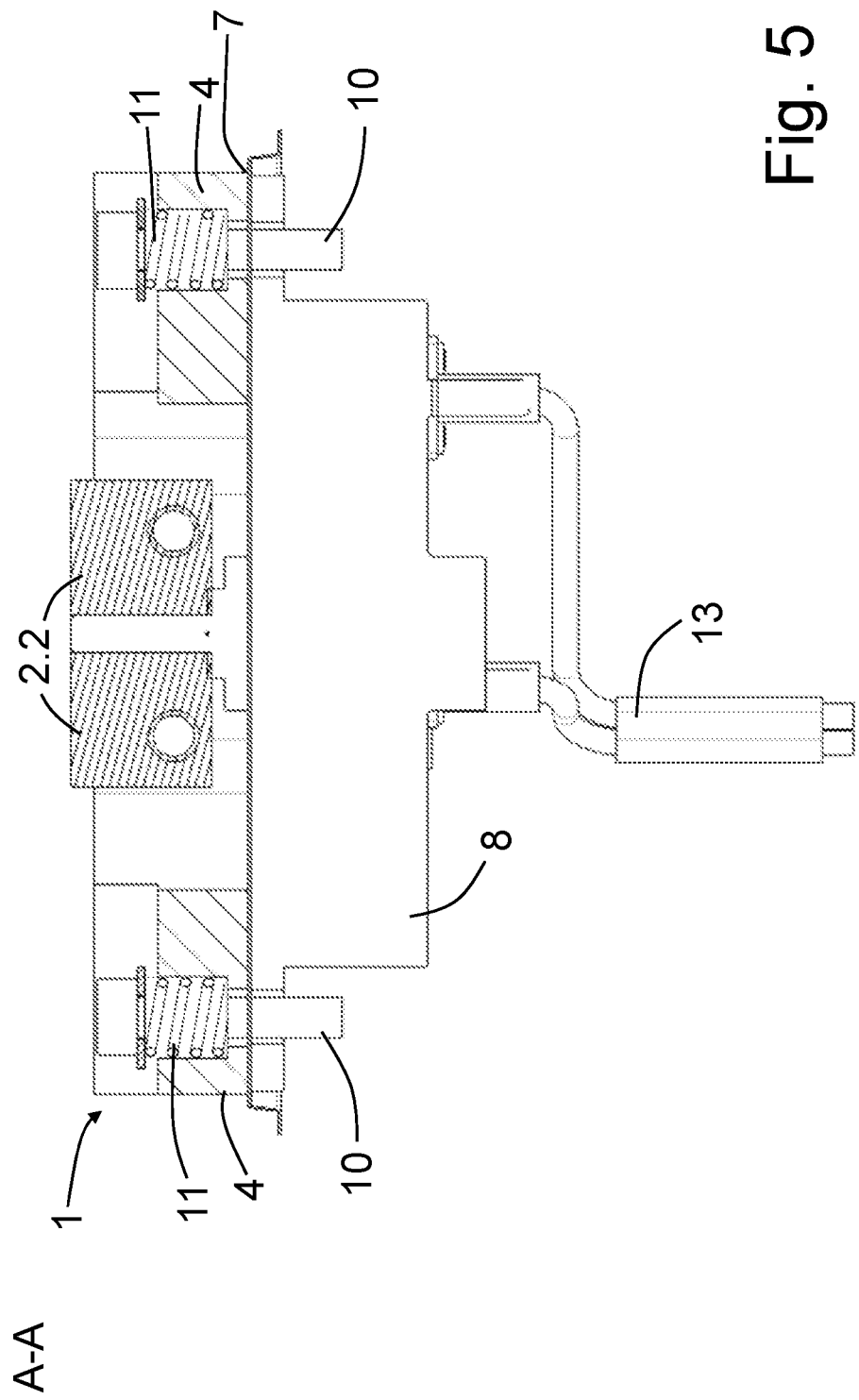
FIG. 5 shows a schematic sectional illustration of the first exemplary embodiment of a shutter installation.

FIG. 5 shows the shutter installation 1 as a sectional illustration along the plane A-A (see FIG. 4). The detent block 4 stands on the support 7 and by means of the screws 10 is held thereon with so much lateral clearance that the movement along the displacement path 6 is possible. A spring 11, which by one end is supported on the screw head and by way of the other end on a protrusion of the detent block 4, is pushed over each of the screws 10. Assembly disks can optionally also be inserted (indicated in the drawing). When the screws 10 during the assembly of the shutter installation 1 are screwed into an assembly plate 15 (see FIG. 6), the springs 11 are simultaneously compressed. In a manner corresponding to the previously selected spring rates of the springs 11, each of the latter causes a force by way of which the detent block 4 and the support 7 are mutually compressed. Taking into account parameters such as the mass of the detent block 4, the material and the roughness values of the mutually contacting surfaces of the detent block 4 and the support 7, as well as optionally envisaged operating temperatures, the action of force caused by the spring can be set such that the desired friction is generated when displacing the detent block 4.

The shutter installation 1 according to the first exemplary embodiment as a complete technical unit can be easily assembled in a microscope 12 (only indicated in the drawing), for example (FIG. 6). To this end, the shutter installation 1 is inserted in a correspondingly-sized opening (not shown) of an assembly plate 15, for example, and connected to the assembly plate 15 by means of the screws 10 (see FIGS. 1 to 5). The assembly takes place such that the shutter leaf 2.1 exposes the optical beam path 9 in the first operating position (first terminal position E1) and shuts the optical beam path 9 in the second operating position (second terminal position E2, not shown here).

The shutter installation 1, more specifically the drive 8, by means of the lines 13 is connected to a control unit 14 that can be configured as a microcontroller and a motor driver, as a computer, or as a FPGA (field programmable gate array), for example. The control unit 14 can generate control signals and transmit the latter to the drive 8 which causes the corresponding actuating movements of the shutter element 2. It is also possible for control commands to be generated, which, in at least one of the terminal positions E1, E2 press the hammer 2.2 against the respective detent face 5.1, 5.2 for a certain time period and hold the hammer 2.2 thereon. This operating type of the shutter installation 1 is relevant in particular, for example, when the detent faces 5.1, 5.2, or the entire detent block 4, are/is composed of an elastic material.

In a second exemplary embodiment of the shutter installation 1, the detent block 4 is configured as a ball which, when the hammer 2.2 impacts one of the detent faces 5.1 or 5.2, respectively, is moved along a displacement path 6 in the form of a groove, a duct or a tube between the first terminal position E1 and the second terminal position E2 (FIG. 7). At the respective terminal positions, the ball 4 by way of part of the circumference thereof protrudes from the displacement path 6 such that the ball 4 can be impinged by the hammer 2.2. The ball 4, by virtue of the acceleration required by the ball 4 and the frictional resistance arising, while traveling the displacement path 6 discharges energy. In order for the ball 4 to be held at the respective terminal positions E1 and E2, respectively, the displacement path 6, for example the duct or the tube, can be shaped so as to slightly taper. A small cavity or a ramp at the respective end of the displacement path 6 is also possible. The use of a magnet would also be conceivable. However, the ball 4 should be held at the terminal positions E1 and E2, respectively, only to the extent that no resistance, or if at all only an insignificant resistance, has to be overcome in order for the occurrence of additional impulses or vibrations to be avoided.

LIST OF REFERENCE SIGNS

1 Shutter installation
2 Shutter element
2.1 Shutter leaf
2.2 Hammer
3 Rotation axis
4 Detent block
5 Detent
5.1 First detent face
5.2 Second detent face
6 Displacement path
7 Support
8 Drive/motor
9 Optical beam path, opening
10 Screw
11 Spring, resilient element
12 Microscope
13 Lines
14 Control unit
15 Assembly plate
E1 First terminal position
E2 Second terminal position

The invention claimed is:

1. A shutter installation for an optical beam path, the shutter installation comprising:
 a shutter element configured for shutting the optical beam path;
 a drive configured for moving the shutter element in a controlled manner along a displacement path between two terminal positions; and
 at least one detent block, each detent block having a at least one detent face against which the shutter element in one of the terminal positions is configured to be moved, wherein each detent block is configured to be displaced by the shutter element from the terminal position of the detent block by a distance along a displacement path.

2. The shutter installation according to claim 1, wherein each detent face of the at least one detent block is composed of a hard material.

3. The shutter installation according to claim 1, wherein each detent face of the at least one detent block is composed of a soft material.

4. The shutter installation according to claim 1, wherein a respective terminal position of a first detent face of the at least one detent block is configured to be re-established, respectively, as a consequence of the displacement of the respective a second detent face of the detent block.

5. The shutter installation according to claim 1, wherein the detent block has a plurality of faces defining a common detent block which has a U-shape or possesses a U-shaped recess.

6. The shutter installation according to claim 1, wherein the drive is configured to be decelerated while traveling a respective portion of the displacement path.

7. The shutter installation according to claim 1, further comprising a means for adjusting a frictional resistance applied to the at least one detent block when the detent block moves along the displacement path.

8. The shutter installation according to claim 7, wherein the means for adjusting a frictional resistance includes a contact pressure means for applying a contact pressure force which is directed from the detent block onto a support of the detent block.

9. The shutter installation according to claim 8, wherein the contact pressure means includes at least one resilient element, which in a tensioned state presses the detent block against the support or pulls the detent block away from the support by way of a predetermined acting force.

10. The shutter installation according to claim 7, wherein the means for adjusting a frictional resistance includes predetermined roughness values of mutually contacting surfaces of the detent block and of a support of the detent block.

\* \* \* \* \*